United States Patent [19]

Ivey

[11] 4,040,339
[45] Aug. 9, 1977

[54] AXIALLY ADJUSTABLE CLUTCH PISTONS

[75] Inventor: John Saxon Ivey, Bloomfield Hills, Mich.

[73] Assignee: Borg-Warner Corporation, Chicago, Ill.

[21] Appl. No.: 674,343

[22] Filed: Apr. 7, 1976

[51] Int. Cl.² .................................................. F16J 1/10
[52] U.S. Cl. ........................................ 92/129; 92/176; 188/72.4; 192/85 AA
[58] Field of Search ............ 192/85 AA; 92/172, 260, 92/129, 176; 188/72.3, 72.4

[56] References Cited

U.S. PATENT DOCUMENTS

| 2,351,554 | 6/1944 | Simpson | 188/72.4 |
| 3,848,518 | 11/1974 | Martin | 192/85 AA |

Primary Examiner—Benjamin W. Wyche
Attorney, Agent, or Firm—Robert L. Zieg

[57] ABSTRACT

A piston for a fluid actuator being formed of two annular sheet metal members having axially and radially extending portions whereby when said piston transmits force, a box-like sheet metal structure is formed.

2 Claims, 3 Drawing Figures

AXIALLY ADJUSTABLE CLUTCH PISTONS

SUMMARY OF THE INVENTION

It has been recognized in fluid actuator structures that cost savings can be obtained by replacing the relatively expensive molded annular machined piston members with sheet metal constructions. However, it has been a problem to provide such structures of sheet metal wherein sufficient rigidity and dimensional control is available to provide a properly operating structure. The invention disclosed herein presents a unique solution to this problem by having a piston assembly comprised of a first annular sheet metal piston member having a portion thereof extending radially inward from an outer axially extending portion, a second annular piston member having a section thereof extending radially outward from an inner axially extending portion thereof, the respective axially extending portions of each member being in engagement with the radially extending portions of the other member when said assembly is subjected to fluid pressure whereby a relatively strong box-shaped construction is defined. Further, a serrated or scalloped edge may be provided on the axially extending portion of each member whereby a coining operation may be performed on said serrations to precisely control the length of said axially extending portions. It is also contemplated that optionally the length of the axially extending portion may be controlled by other precision metal shaping techniques as, for example, machining or grinding.

DETAILED DESCRIPTION

Figure 1:
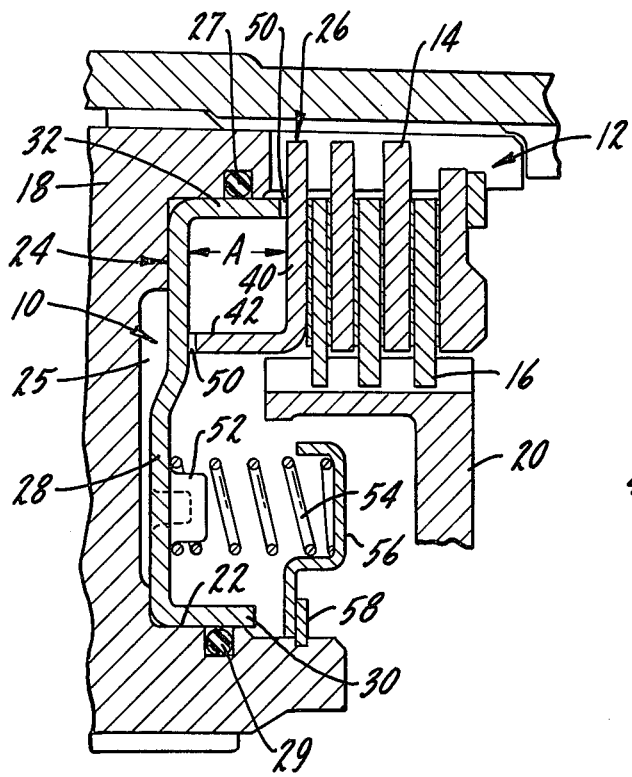
FIG. 1 is a cross-sectional view through a fluid actuator and friction engaging device embodying the principles of the present invention.

Referring to FIG. 1, the improved piston arrangement 10 of the present invention is shown as used in a fluid actuator for a friction engaging device 12 which may be either a clutch or brake mechanism of the disc type, for example. The friction device includes a plurality of interleaved discs 14 and 16. The discs 14 are splined to engage with a first member 18 and the discs 16 are splined to engage with a second member 20. If the friction device 12 is a brake mechanism, one of the members 18 or 20 will be stationary, and when the friction device 12 is engaged, the other member will be held stationary. If the friction device 12 is a clutch mechanism, each of the members will be capable of rotation but will be coupled for rotation together when the friction device 12 is engaged.

Improved piston mechanism or assembly 10 of the present invention is illustrated mounted within a bore 22 in the member 18. Piston mechanism 10 is comprised mainly of two sheet metal components which are engageable comprising a first annular sheet metal member 24 and a second annular sheet metal member 26 adapted to be acted upon by member 24.

Sheet metal member 24 is generally cup-shaped as shown in FIG. 1 in cross section. Member 24 has a radially extending portion 28, an inner axially extending portion 30, and an outer axially extending portion 32, the portions 30 and 32 extending at generally right angles to portion 28.

Piston member 24 together with bore 22 forms a fluid chamber 25. A fluid seal is defined between bore 22 and member 24 by an O-ring 27 mounted in member 18 and in sliding engagement with axially extending portion 32, and an O-ring 29 in member 18 in sliding engagement with axially extending portion 30.

Figure 2:
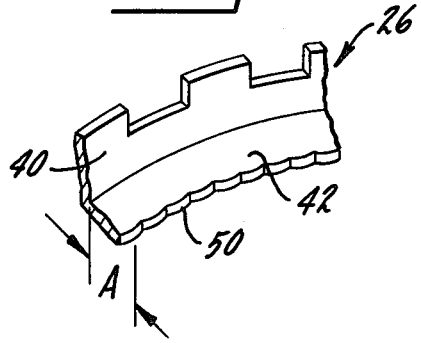
FIG. 2 is a partial perspective view of one of the piston members of the FIG. 1 construction.

Member 26 is generally L-shape in cross section having a radially extending portion 40 and an axially extending portion 42 at right angles to portion 40. The free end of axially extending portion 42 of member 26 and the free end of axially extending portion 32 of member 24 are adapted to engage with the radially extending portions of the other member 24 or 26 as the case may be, when the device is in operation. The free ends of portions 32 and 42 have a plurality of scallops or large serrations 50. Scallops 50, for example, are illustrated as convex in configuration. The portions 50 thus present a generally planar surface to be engaged by the radially extending portion of the other member, the planar surface being defined by the outermost portions of the scallops 50 shown in FIG. 2. As will be described, the purpose of the scallops 50 is to provide a control over the axial length of portions 32 and 42.

In operation, when fluid pressure is admitted to chamber 25 to act on the piston 10, member 24 will be pressed against member 26 and member 26 will engage the friction device. The radially extending portion 40 of member 24 is similar in construction to one of the discs 14 and acts as an apply member. When the piston member 10 moves to the right as shown in FIG. 1, responsive to fluid pressure in chamber 25 to engage the friction device 12, engaging force is transmitted through the axially extending portions 32 and 42. As will be apparent, when the members 24 and 26 engage, they define a box-shaped structure which has great strength and rigidity and a relatively large load capacity. However, this characteristic can only be taken advantage of if the dimension A, which is the distance between the inner surfaces of the radially extending portions of the members 24 and 26, is the same dimension throughout the extent of the box formed by the interengagement of the members. In other words, the distance between the inner surface of the radially extending member on the part 26 to the outer planar surface defined by the outermost portions of the scallops 50 on axially extending portion 42 must be nearly identical to the like dimension between the inner radially extending surface of member 24 and the outermost planar surface defined by the scallops 50 on the axially extending portion 32 of member 24. Only if these dimensions are controlled to be nearly identical will the piston member 10 operate as defined. The use of scallops 50 is particularly suited to this purpose since, by use thereof, the dimension A for each of the members 24 and 26 can be closely controlled by a coining operation on scallops 50 to make such dimension precise. The coining operation to hold dimension A precise is contemplated as the final operation in the manufacture of the members 24 and 26.

As used herein, the term "coining" refers to a cold metal working process which normally takes place in a press-type die in which force is applied to a sheet metal or other part usually for the purpose of improving surface finish or placing a pattern thereon similar to the die pattern, and is additionally used to precisely, dimensionally arrange a part. It is to be noted that by use of the scallop structure (referring to scallops 50) the coining process can be carried out without the use of a great amount of force which would be required without the scallops.

Also provided on the member 24 is a sheet metal protrusion 52 which is formed in the manufacture of member 24 and adapted to be received within a return spring 54. Return spring 54 is engaged within a retainer 56 held in bore 22 by snap ring 58, for example.

If it is desired to have the surface of member 26 which engages the friction material on member 16 at some plane other than exactly radial due to deflections under load of components such as the retaining ring or discs 14 and 16, the dimension A for portions 32 and 42 can be mismatched to dispose the surface of member 26 at a similar angle to the load deflected components of the friction device for improved engagement of the friction elements or discs.

From the above description, it will be seen that the present invention provides a very economical and simple form of piston member which can be used in friction engaging devices obviating the necessity for having molded parts or extensively machined parts in such installation.

Figure 3:
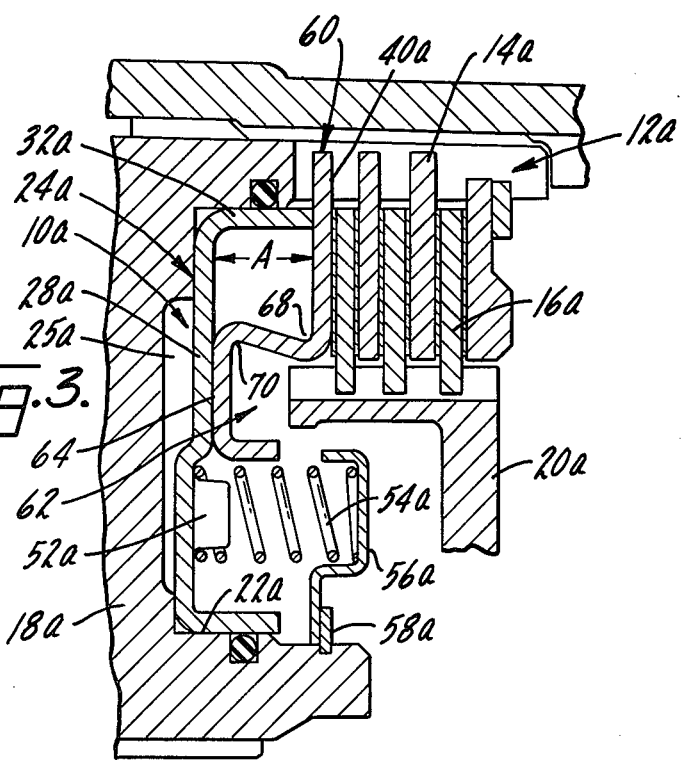
FIG. 3 is a modified embodiment of another form of sheet metal piston for a fluid actuator.

In FIG. 3, an alternate form of sheet metal piston assembly is provided which is likewise suitable as a piston member in a fluid actuator. Like parts of the embodiment of FIG. 3 carry like numbers to those of FIG. 1 with the addition of the suffix a. The end of the axially extending portion 32a of member 24a does not have scallops thereon in this embodiment, merely a flat formed surface. Member 60 of the FIG. 3 embodiment corresponding to member 26 of FIG. 1 has a U-shaped portion generally defined at 62 which presents a flat axially extending thrust surface 64 adapted to engage the radially extending portion 28a of member 24a. In the forming of the portion 62, bends are made to form radii at 68 and 70 in member 60. The dimension A of the FIG. 3 embodiment is thus controlled by controlling the amount of bend placed in the part at the radii 70 and 68, for example. As will be seen, if the angle at radius 68 defined by the member 60 is reduced and the angle at radius 70 is proportionally reduced, the flat surface 64 will remain substantially parallel to the inner surface of radially extending portion 28a of sheet metal member 24a. However, the total dimension between the inner surface of radially extending portion 40a of member 60 and surface 64 will be reduced. Thus, as will be seen, the dimension A can be controlled by variation of the amount of bend in the area of radii 68 and 70.

The invention thus provided is a unique sheet metal piston mechanism comprised of only two pieces requiring no machining but only sheet metal forming steps including precise dimensional control such that the two members will properly interact to form a high-load capacity by definition of a "box-shaped" structure.

What is claimed is:

1. A piston assembly for use in a fluid actuator, wherein the assembly is mounted in a bore and moves in response to fluid pressure applied thereto, comprising a first annular sheet metal piston member having a portion thereof extending radially inward from an outer axially extending portion, a second annular piston member having a section thereof extending radially outward from an inner axially extending portion thereof, the respective axially extending portions of the other member when said assembly is subjected to fluid pressure whereby a relatively strong box-shaped construction is defined during operation of the piston and, the axially extending portions of said first and second piston members having ends thereof remote from the radially extending portions thereof and said ends have a series of scallops or serrations formed thereon wherein the length of the axially extending portions of said first and second piston members is controlled by a coining operation on said scalloped portions.

2. A piston assembly for use in a fluid actuator, wherein the assembly is mounted in a bore and moves in response to fluid pressure applied thereto, comprising a first annular sheet metal piston member having a portion thereof extending radially inward from an outer axially extending portion, a second annular piston member having a section thereof extending radially outward from an inner axially extending portion thereof, the respective axially extending portions of each member being in engagement with the radially extending portions of the other member when said assembly is subjected to fluid pressure to define a relatively strong box-shaped construction of the piston assembly, wherein said second piston member has an inner radial extension adapted to engage said radially extending portion of said first piston, the effective length of said axially extending portion of said second piston being variable by varying the angular displacement between the radially extending portions and the axially extending portion of said second piston member whereby the axial dimension of said piston assembly may be controlled.

* * * * *

UNITED STATES PATENT OFFICE
CERTIFICATE OF CORRECTION

PATENT NO. : 4,040,339

DATED : August 9, 1977

INVENTOR(S) : JOHN S. IVEY

It is certified that error appears in the above-identified patent and that said Letters Patent are hereby corrected as shown below:

Column 4, line 16, after "portions of"

insert -- each member being in engagement with radially extending portions of the --.

Signed and Sealed this

Twenty-ninth Day of November 1977

[SEAL]

Attest:

RUTH C. MASON
Attesting Officer

LUTRELLE F. PARKER
Acting Commissioner of Patents and Trademarks